United States Patent [19]

Ishiguro et al.

[11] Patent Number: 5,068,544
[45] Date of Patent: Nov. 26, 1991

[54] FSK DATA WAVEFORM SHAPING CIRCUIT

[75] Inventors: Kazuhisa Ishiguro; Yutaka Sekiguchi, both of Gunma, Japan

[73] Assignee: Sanyo Electric Co., Ltd., Moriguchi, Japan

[21] Appl. No.: 552,732

[22] Filed: Jul. 16, 1990

[30] Foreign Application Priority Data

Jul. 18, 1989 [JP] Japan .................. 1-185587

[51] Int. Cl.$^5$ .................................. H04L 27/14
[52] U.S. Cl. .................... 307/268; 307/359; 328/164
[58] Field of Search ............ 307/260, 261, 268, 490, 307/494, 359; 328/28, 164; 375/88, 90; 329/301

[56] References Cited

U.S. PATENT DOCUMENTS 4,612,509  9/1986  Betts et al. .................. 375/88
5,015,961  5/1991  Springer et al. ............. 375/88

FOREIGN PATENT DOCUMENTS 0161914  6/1989  Japan ........................ 307/268

Primary Examiner—Stanley D. Miller
Assistant Examiner—Sinh N. Tran
Attorney, Agent, or Firm—Armstrong, Nikaido, Marmelstein, Kubovcik & Murray

[57] ABSTRACT

A FSK data signal voltage inputted from an input terminal 4 is converted into current by a resistance $R_1$ and then the current is differentially amplified with respect to a reference voltage of a capacitor $C_1$ in a second differential amplifier circuit 2. As a result, a waveform-shaped signal is generated from each collector of transistors $Q_2$ and $Q_3$ constituting the second differential amplifier circuit 2. Meanwhile, the FSK data signal inputted from the input terminal 4, after an alternating current signal component thereof is removed, is applied to a third differential amplifier circuit 3 wherein a difference between the signal and the reference voltage of the capacitor $C_1$ is amplified. Charging/discharging the capacitor $C_1$ is controlled in response to an output of the third differential amplifier circuit 3.

2 Claims, 4 Drawing Sheets

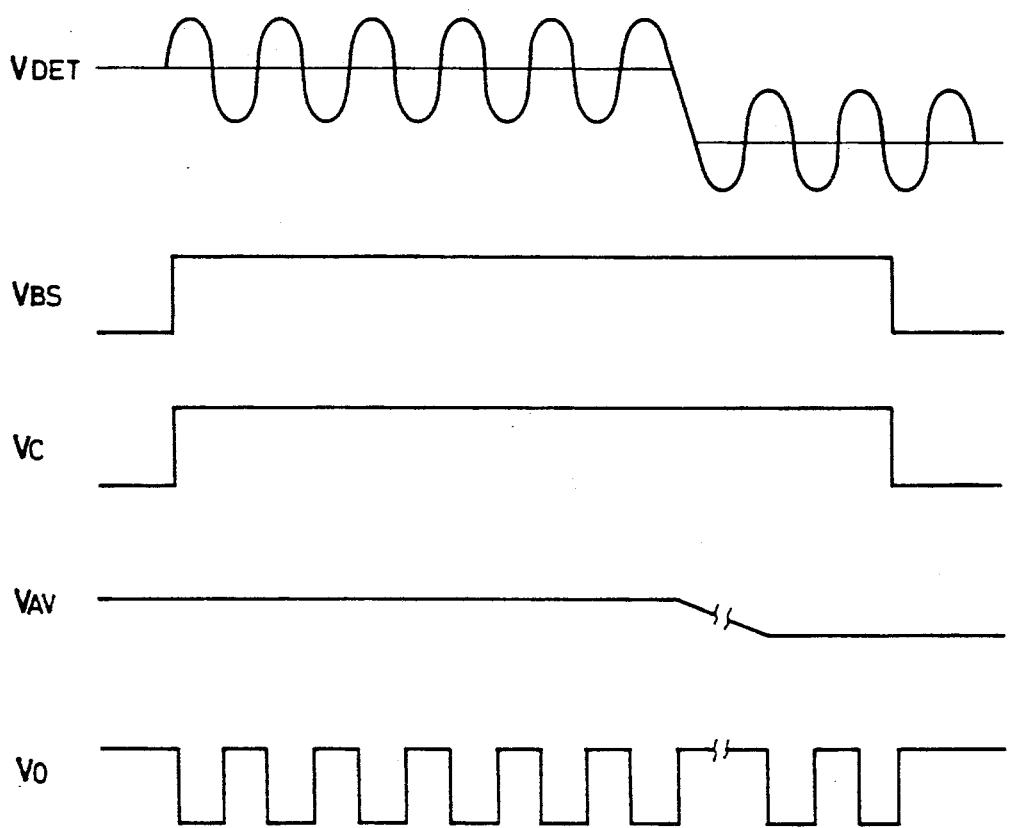

FSK DATA WAVEFORM SHAPING CIRCUIT

BACKGROUND OF THE INVENTION

1. Field of the Invention

The present invention relates generally to FSK data waveform shaping circuits, and more particularly, to a waveform shaping circuit for use in a FSK data receiving system.

2. Description of the Background Art

The FSK data receiving system is for receiving FSK (Frequency Shift Keying) modulated data and it is used, for example, as the paging system. The paging system is a system wherein the determination is made whether or not received FSK data includes predetermined data, to inform a person of the detection of the FSK data including the predetermined data by a buzzer or the like.

FIG. 1 is a block diagram showing a general arrangement of a FSK data receiving system for use as such paging system as described above or the like. In the drawing, the FSK data receiving system comprises a radio frequency amplifier circuit 31, a frequency converting circuit 32, an intermediate frequency amplifier circuit 33, an FM detecting circuit 34, a low pass filter 35, a waveform shaping circuit 36 and a CPU 37. The CPU 37 has the functions of FSK demodulation by discriminating a width of output pulse of the waveform shaping circuit 36, controls of a receiving block based on the demodulated signal and calling or displaying.

In the FSK data receiving system structured as described above, a direct current level of detection output of the FM detecting circuit 34 fluctuates due to fluctuations of a local oscillating frequency of the frequency converting circuit 32 and variations of characteristics of the FM detecting circuit 34 and the like. In the FSK demodulation, demodulation by discriminating a pulse width, because the data has the direct current level, it is impossible to perform fidelity demodulation by a waveform shaping circuit simply comparing the detection output with a fixed reference potential. Therefore, such waveform shaping circuit as shown in FIG. 2 is conventionally used in common.

In FIG. 2, a terminal 41 receives an FM detecting signal $V_{DET}$ through the low pass filter 35 of FIG. 1. A time constant circuit comprising a resistance $R_{41}$ and a capacitor $C_{41}$ is connected between the terminal 41 and a non-inversion input terminal of a comparator 42. Since a frequency of a signal to be used in the FSK system is several hundreds Hz, a time constant of the time constant circuit is set to be relatively large. In addition, a resistance $R_{42}$ of the same resistance value as that of the resistance $R_{41}$ is connected between the terminal 41 and an inversion input terminal of the comparator 42 to prevent offset. Furthermore, a power supply terminal of the comparator 42 is grounded through a control transistor $Q_{41}$. A battery save signal (referred to simply as a control signal $V_{BS}$ which intermittently attains a high level is inputted to a base of the control transistor $Q_{41}$. Consequently, the waveform shaping circuit 36 intermittently operates, which reduces power consumption. The control signal $V_{BS}$ is also supplied to other circuit blocks of the FSK data receiving system.

Now, referring to a waveform diagram of FIG. 3, an operation of the conventional waveform shaping circuit shown in FIG. 2 will be described. As shown in FIG. 3, the control signal $V_{BS}$ is an intermittent signal attaining a high level in the periods I and II and a low level in the period III. When the control signal $V_{BS}$ attains the high level, the comparator 42 is brought into operation and the other circuit blocks start operating, so that the FM detecting signal $V_{DET}$ is inputted to the terminal 41. Then, in the period II after the lapse of about $\tau (=C_{41} R_{41})$ from the rise of the control signal $V_{BS}$, the time constant circuit inputs a mean value voltage $V_{AV}$ of the FM detecting signal $V_{DET}$ to the non-inversion input terminal of the comparator 42. In the period III wherein the control signal $V_{BS}$ attains the low level after the period II, charged electric charges in the capacitor $C_{41}$ of the time constant circuit are discharged through the resistance $R_{41}$ and the low pass filter 35. Accordingly, out of the respective periods wherein the control signal $V_{BS}$ attains the high level, the comparator 42 performs accurate waveform shaping only in the period II. For the purpose of simplicity, the waveform of the FM detecting signal $V_{DET}$ of FIG. 3 is demodulation of the FSK data signal modulated by the data simply cycling "1010 ...".

As the foregoing, in the conventional waveform shaping circuit shown in FIG. 2, the charged electric charges in the capacitor $C_{41}$ of the time constant circuit are discharged every time the idle period III comes as shown in FIG. 3. Therefore, even if the control signal $V_{BS}$ attains the high level, the normal waveform shaping operation can not be performed in the period I, whereby the power consumption during the period will be a wast. Accordingly, the electric power can not be made full use of. In addition, since the time constant circuit has a time constant of about 200 ms, it can not respond to transient fluctuations in a direct current level, causing a frequency to shift, which results in that accurate waveform shaping can not be performed.

SUMMARY OF THE INVENTION

An object of the present invention is to provide a waveform shaping circuit directed to further reducing power consumption.

Another object of the present invention is to provide a waveform shaping circuit having excellent transient characteristics and by which accurate waveform shaping can be performed.

The FSK data waveform shaping circuit according to the present invention comprises first to third differential amplifier circuits and capacitance means. The first differential amplifier circuit includes first and second transistors, and the first transistor having a base and a collector short-circuited. The second differential amplifier circuit includes third and fourth transistors, the third transistor having a base and an emitter connected to the base and an emitter of the first transistor, respectively, and the fourth transistor having a base and an emitter connected to a base and an emitter of the second transistor, respectively. The third differential amplifier circuit includes fifth and sixth transistors, the fifth transistor having a base connected to the base of the first transistor and the sixth transistor having a base connected to the base of the second transistor. The capacitance means is connected to the base of the second transistor and it is charged/discharged by an output signal of the third differential amplifier circuit. FSK data to be waveform-shaped is inputted to the base of the first transistor, so that waveform-shaped output signal is generated at least one of collectors of the third and fourth transistor.

In the present invention, discharging the charged electric charges of the capacitance means can be prevented in an idle period. In addition, transient characteristics can be improved by rapidly charging/discharging the capacitance means by the output signal of the third differential amplifier circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a waveform diagram showing an operation of the embodiment shown in FIG. 4.

DESCRIPTION OF THE PREFERRED EMBODIMENTS

Figure 4:
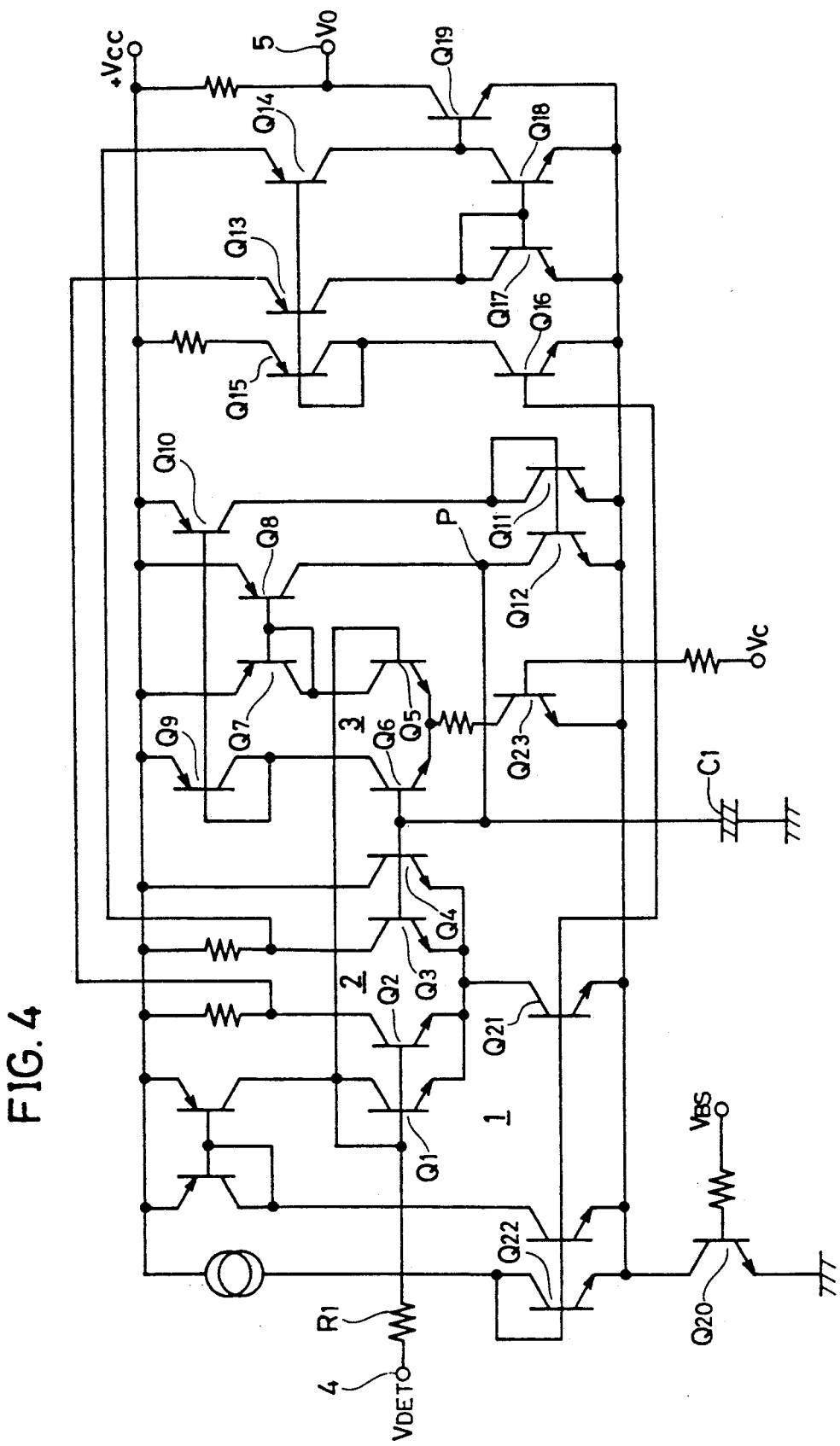
FIG. 4 is a circuit diagram showing an arrangement of a FSK data waveform shaping circuit according to one embodiment of the present invention.

FIG. 4 is the circuit diagram showing the FSK data waveform shaping circuit according to one embodiment of the present invention. In the drawing, the waveform shaping circuit comprises first to third differential amplifier circuits 1 to 3. The first differential amplifier circuit 1 includes a transistor $Q_1$ having a base and a collector short-circuited to each other and a transistor $Q_4$ having an emitter connected to an emitter of the transistor $Q_1$. The second differential amplifier circuit 2 includes a transistor $Q_2$ having a base and an emitter respectively connected to the base and the emitter of the transistor $Q_1$ and a transistor $Q_3$ having a base and an emitter respectively connected to a base and the emitter of the transistor $Q_4$. Each emitter of the transistors $Q_1$, $Q_2$, $Q_3$ and $Q_4$ is connected in common to a collector of a current source transistor $Q_{21}$. In addition, the third differential amplifier circuit 3 includes a transistor $Q_5$ having a base connected to the respective bases of the transistors $Q_1$ and $Q_2$ and a transistor $Q_6$ having a base connected to the respective bases of the transistors $Q_3$ and $Q_4$.

Figure 1:
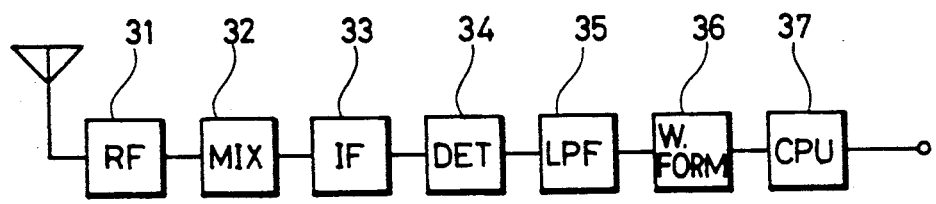
FIGS. 1 is a block diagram showing a general arrangement of a FSK data receiving system.
Figure 2:
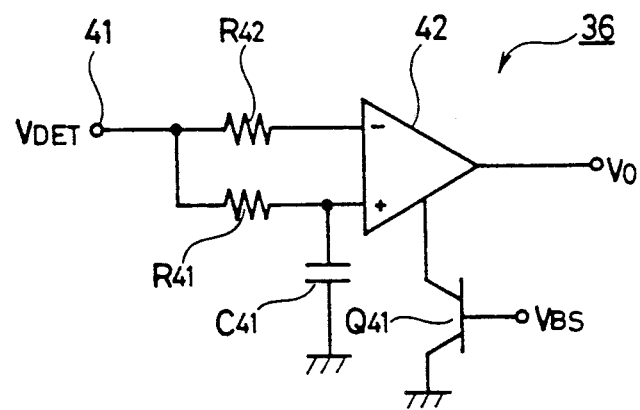
FIG. 2 is a circuit diagram showing an arrangement of a conventional FSK data waveform shaping circuit.
Figure 3:
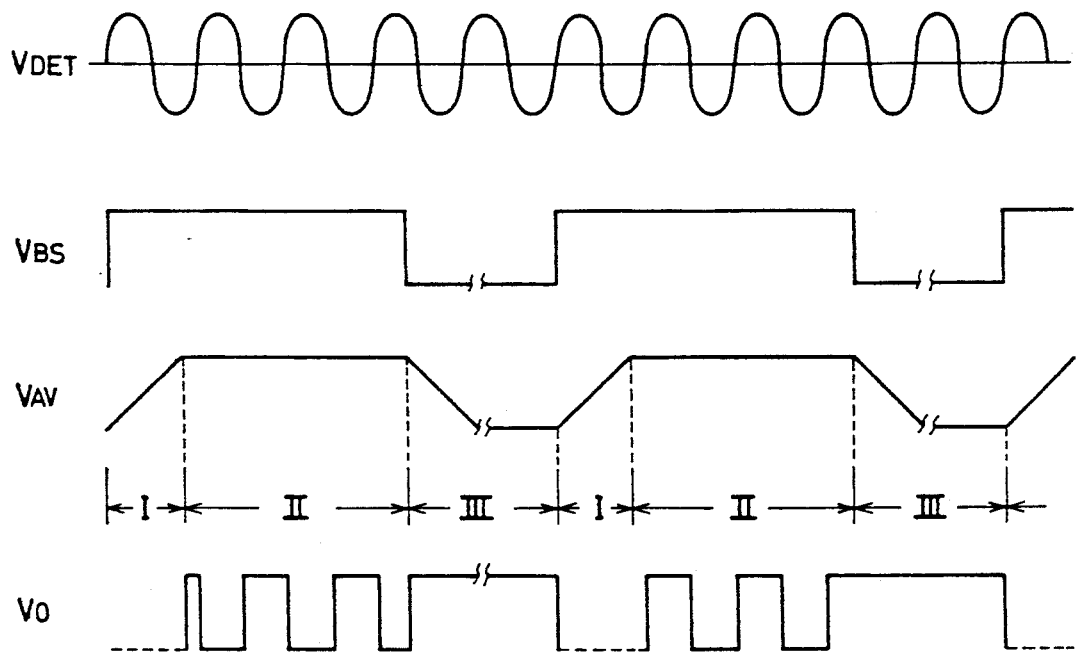
FIG. 3 is a waveform diagram explaining an operation of the conventional waveform shaping circuit shown in FIG. 2.

An input terminal 4 receives the output signal of the FM detecting circuit 34 shown in FIG. 1 through the low pass filter 35. The output signal voltage from the low pass filter 35 applied to the input terminal 4 is converted into current by a resistance $R_1$ and then supplied to the bases of the transistors $Q_1$ and $Q_2$. Herein, since the transistor $Q_1$ has the base and the collector directly connected with each other, a base voltage thereof is virtually grounded in an alternating manner. Therefore, assuming that a voltage of the output signal from the low pass filter 35 which is applied to the input terminal 4 is $V_{DET}$ and a resistance value of the resistance $R_1$ is r1, a current value is represented as $V_{DET}/r1$ and varies with the voltage $V_{DET}$. Then, the current converted by the resistance $R_1$ are amplified by the first and second differential amplifier circuits 1 and 2 and the amplified current are transmitted from collectors of the transistors $Q_2$ and $Q_3$ constituting the second differential amplifier circuit 2 to the circuits in the succeeding stage.

Since the base of the transistor $Q_5$ constituting the third differential amplifier circuit 3 is connected to the base of the transistor $Q_1$ constituting the first differential amplifier circuit 1, the current converted by the resistance $R_1$ is amplified also in the third differential amplifier circuit 3, so that output current is generated at collectors of the transistors $Q_5$ and $Q_6$. The output current of the transistors $Q_5$ is applied to a current mirror circuit comprising transistors $Q_7$ and $Q_8$. The output current of the transistor $Q_6$ is applied to a current mirror circuit comprising transistors $Q_{11}$ and $Q_{12}$ through a current mirror circuit comprising transistors $Q_9$ and $Q_{10}$. Accordingly, current having a value of a difference between the output current of the transistors $Q_5$ and the output current of $Q_6$ is generated at a connection point P between a collector of the transistor $Q_8$ and a collector of $Q_{12}$. Then, the difference current charges/discharges a capacitor $C_1$ provided between the bases of the transistors $Q_3$, $Q_4$ and $Q_5$ connected in common and ground. For example, if a base direct current voltage of the transistor $Q_5$ becomes higher than a base direct current voltage of the transistor $Q_6$, collector current of the transistor $Q_8$ becomes larger than collector current of the transistor $Q_{12}$, so that capacitor $C_1$ is charged. In addition, when the base direct voltage of the transistor $Q_5$ becomes lower than the base direct current voltage of the transistor $Q_6$, the collector current of the transistor $Q_8$ becomes smaller than the collector current of the transistor $Q_{12}$, so that the capacitor $C_1$ is discharged.

Now, with the capacitor being completely discharged, if the output voltage $V_{DET}$ of the FM detecting circuit 34 is applied to the input terminal 4, the transistors $Q_1$, $Q_2$ and $Q_5$ are rendered conductive in response to the direct current voltage $V_{AV}$. Therefore, current corresponding to the collector current of the transistor $Q_5$ is applied to the capacitor $C_1$ through the transistors $Q_7$ and $Q_8$, whereby the capacitor $C_1$ is charged. After the lapse of a predetermined time period, a terminal voltage of the capacitor $C_1$ attains $V_{AV}$, so that bias of the first and second differential amplifier circuits 1 and 2 becomes appropriate. In this state, when a signal voltage (alternating current voltage) in the output voltage of the FM detecting circuit 34 is applied to the input terminal 4, the signal voltage is converted into current by the resistance $R_1$ and the current is supplied to the transistors $Q_1$ and $Q_2$. As a result, the first and second differential amplifier circuits 1 and 2 perform an amplificating operation (comparing operation) by using the terminal voltage $V_{AV}$ of the capacitor $C_1$ as a reference, whereby output signals are generated at the collectors of $Q_2$ and $Q_3$. On this occasion, while the current corresponding to the above-described signal voltage is applied also to the base of the transistor $Q_5$, setting a charging/discharging constant of the capacitor $C_1$ larger than a signal cycle prevents the terminal voltage of the capacitor $C_1$ from following the signal change, so that the reference voltage does not widely vary.

The output voltages developed at the collectors of the transistors $Q_2$ and $Q_3$ are applied to emitters of transistors $Q_{13}$ and $Q_{14}$. Each of the transistors $Q_{13}$ and $Q_{14}$ is connected to a diode-connected transistor $Q_{15}$ in a current-mirror manner. In addition, collector current of the transistor $Q_{15}$ is fixed corresponding to collector current of a current source transistor $Q_{16}$. Therefore, when the output signal of the second differential amplifier circuit 2 is 0, emitter voltages of the transistors $Q_{13}$ and $Q_{14}$ become equal to an emitter voltage of the transistor $Q_{15}$, so that collector current of the transistors $Q_{13}$ and $Q_{14}$ becomes equal to the collector current of the transistor $Q_{15}$. Since a transistor $Q_{17}$ receiving the collector current of the transistor $Q_{13}$ constitutes a current-mirror circuit together with a transistor $Q_{18}$, collector current of the transistor $Q_{18}$ becomes equal to the collector current of the transistor $Q_{13}$. Herein, as described above, when the output signal of the second differential amplifier circuit 2 is 0 the collector current of the transistor $Q_{14}$ becomes equal to the collector current of the transistor $Q_{13}$. Accordingly, in this case, the collector current of the transistor $Q_{14}$ and the collector current of the transistor $Q_{18}$ become equal to each other, so that no current is supplied to a base of a transistor $Q_{19}$. Accordingly, the transistor $Q_{19}$ is turned off, whereby an output signal of a "H" (logical high) level is generated at an output terminal 5. In addition, assuming that an output voltage rendering the emitter voltage of the transistor $Q_{14}$ higher than that of the transistor $Q_{13}$ is generated from the second differential amplifier circuit 2, the collector current of the transistor $Q_{14}$ becomes larger than those of the transistor $Q_{13}$. As a result, the collector current of the transistor $Q_{14}$ becomes larger than that of the transistor $Q_{18}$, so that the transistor $Q_{19}$ is turned on. Consequently, an output signal of a "L" (logical low) level is generated at the output terminal 5. On the contrary, when an output voltage rendering the emitter voltage of the transistor $Q_{13}$ higher than that of the transistor $Q_{14}$ is generated from the second differential amplifier circuit 2, the transistor $Q_{19}$ is turned off, so that an output signal of the "H" level is generated at the output terminal 5, as in the above-described case wherein the output signal of the second differential amplifier circuit 2 is 0.

Now, an operation of the embodiment of FIG. 4 in relation to a battery save signal $V_{BS}$ and a charge control signal $V_C$ will be described in reference to the waveform diagram of FIG. 5. In a battery saved state, the battery save signal $V_{BS}$ cycles the "H" level and the "L" level continuously and the charge control signal $V_C$ remains at the "L" level. In a signal received state, both of the battery save signal $V_{BS}$ and the charge control signal $V_C$ attain the "H" level, so that the entire circuit of FIG. 4 is brought into a normal operation. When the battery save signal $V_{BS}$ attains the "H" level, a transistor $Q_{20}$ is turned on and a diode-connected transistor $Q_{22}$ is turned on. In response thereto, the current source transistors $Q_{21}$ and $Q_{16}$ are turned on. When the charge control signal $V_C$ attains the "H" level, a transistor $Q_{23}$ is turned on, so that the third differential amplifier circuit 3 starts operating. In the signal received state, since both of the battery save signal $V_{BS}$ and the charge control signal $V_C$ attain the "H" level as shown in FIG. 5, a normal waveform shaping operation is carried out wherein an output signal $V_0$ as shown in FIG. 5 is generated at the output terminal 5. On this occasion, the terminal voltage of the capacitor $C_1$ becomes equal to the direct current voltage $V_{AV}$ in the input signal by the third differential amplifier circuit 3, as shown in FIG. 5.

On entering the battery saved state, the charge control signal $V_C$ attains the "L" level, so that the third differential amplifier circuit 3 is turned off. As a result, the terminal voltage of the capacitor $C_1$ becomes the direct current voltage $V_{AV}$ in the input signal immediately before entering the battery saved state and remains at the same value during the battery saved state. Then, on entering another signal received state, since the terminal voltage of the capacitor $C_1$ is approximately $V_{AV}$, the waveform shaping operation is immediately started.

In addition, since the third differential amplifier circuit 3 starts operating on entering the signal received state, the slight discharge of the capacitor $C_1$ is immediately compensated for. Accordingly, the output signal $V_0$ obtained at the output terminal 5 has a right waveform immediately after entering the signal received state, as shown in FIG. 5.

In the signal received state, if frequency shift of the carrier of the received signal occurs due to drift of the local oscillating frequency and the like, the direct current voltage in the output signal of the FM detecting circuit 34 varies. In the waveform shaping circuit of FIG. 4, if such change of the direct current voltage occurs, the third differential amplifier circuit 3 immediately detects the change and charges/discharges the capacitor $C_1$ to cause the terminal voltage of the capacitor $C_1$ to follow the direct current voltage after the change. Accordingly, even when the frequency shift occurs, it is possible to generate an output signal of the right waveform in a short time period. As an example, in case of FIG. 4, with respect to an input signal of about 500 Hz, the normal operation can be restored to in about 15 ms. Furthermore, since the transistor $Q_1$ is diode-connected, and the base of which is virtually grounded in an alternating manner, the input signal voltage applied to the input terminal 4 is completely converted into current by the resistance $R_1$. Therefore, the input signal voltage can be accurately converted into currents.

As described above, with the waveform shaping circuit according to the present invention, it is possible to perform an accurate waveform shaping except for in a predetermined time period after the application of the main power and remarkable effects can be obtained such as excellent transient characteristics. In particular, in the battery saved state, the reference level can be maintained, whereby when the direct current voltage varies due to the frequency shift, it is possible to immediately cause the reference level to follow the change. Besides, it is also possible to cause the reference level not to follow the alternating current voltage of the input signal, and therefore rapid and accurate waveform shaping can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A FSK data waveform shaping circuit for waveform-shaping FM detected FSK data and outputting the waveform-shaped FSK data, comprising:
   a first differential amplifier circuit including first and second transistors, said first transistor having a base and a collector short-circuited to each other,
   a second differential amplifier circuit including third and fourth transistors, said third transistor having a base and an emitter respectively connected to the base and an emitter of said first transistor and said fourth transistor having a base and an emitter respectively connected to a base and an emitter of said second transistor,
   a third differential amplifier circuit including fifth and sixth transistors, said fifth transistor having a base connected to the base of said first transistor and said sixth transistor having a base connected to the base of said second transistor, and capacitance means connected to the base of said second transistor and charged/discharged in accordance with an output signal of said third differential amplifier circuit, base of said first transistor receiving the FSK data to be waveform-shaped and a waveform-shaped output signal being generated at least at one of collectors of said third and fourth transistors.

2. A FSK data waveform shaping circuit according to claim 1, wherein each of said first and second differential amplifier circuits has a current source transistor, said current source transistor being intermittently driven in response to a battery save signal.

* * * * *